(12) United States Patent
Larsson

(10) Patent No.: US 11,767,200 B2
(45) Date of Patent: Sep. 26, 2023

(54) HOLDING DEVICE FOR LOAD HANDLING TOOL AND HYDRAULIC CRANE COMPRISING SUCH A HOLDING DEVICE

(71) Applicant: Cargotec Patenter AB, Ljungby (SE)

(72) Inventor: Joakim Larsson, Näsviken (SE)

(73) Assignee: Hiab AB, Kista (SE)

( * ) Notice: Subject to any disclaimer, the term of this patent is extended or adjusted under 35 U.S.C. 154(b) by 999 days.

(21) Appl. No.: 16/671,509

(22) Filed: Nov. 1, 2019

(65) Prior Publication Data
US 2020/0140244 A1 May 7, 2020

(30) Foreign Application Priority Data
Nov. 6, 2018 (EP) ..................................... 18204673

(51) Int. Cl.
*B66C 23/62* (2006.01)
*B66C 23/04* (2006.01)
*F16M 13/02* (2006.01)

(52) U.S. Cl.
CPC .............. *B66C 23/62* (2013.01); *B66C 23/04* (2013.01); *F16M 13/02* (2013.01)

(58) Field of Classification Search
CPC .......... B66C 23/04; B66C 23/62; F16M 13/02
See application file for complete search history.

(56) References Cited

U.S. PATENT DOCUMENTS

| 7,090,086 | B2 * | 8/2006 | Dupre ..................... B66C 13/12 52/118 |
| 7,360,662 | B2 * | 4/2008 | Montineri ............. B66F 9/0655 212/349 |
| 7,703,616 | B2 * | 4/2010 | Rafailovic .............. F15B 13/07 212/289 |
| 2006/0249469 | A1 * | 11/2006 | Badia .................... F15B 11/205 212/349 |
| 2010/0301001 | A1 * | 12/2010 | Hockema ................ B66C 23/44 212/180 |

FOREIGN PATENT DOCUMENTS

| EP | 2 080 729 A2 | 7/2009 |
| WO | 2006/121406 A1 | 11/2006 |

* cited by examiner

*Primary Examiner* — Saul Rodriguez
*Assistant Examiner* — Brendan P Tighe
(74) *Attorney, Agent, or Firm* — Dilworth & Barrese, LLP

(57) ABSTRACT

A holding device for use with a telescopically extensible crane boom (57) in order to keep a load handling tool (4) in a given parking position in relation to the crane boom. The holding device (1) comprises:
an attachment (10) to be fixed to an end of a telescopic crane boom section of the crane boom;
a tool holder (15), which is detachably mountable to the attachment (10) and configured for engagement with the tool in order to support it against the crane boom and keep it in the parking position, the tool holder being provided with a sliding member (28), through which the tool holder is configured to slidably rest against an external surface on the crane boom; and
a locking mechanism (16) for locking the tool holder and the attachment to each other when the tool holder is mounted to the attachment.

20 Claims, 5 Drawing Sheets

HOLDING DEVICE FOR LOAD HANDLING TOOL AND HYDRAULIC CRANE COMPRISING SUCH A HOLDING DEVICE

FIELD OF THE INVENTION AND PRIOR ART

The present invention relates to a holding device according to the description herein, which is to be used to keep a load handling tool of a crane in a given parking position in relation to a telescopically extensible crane boom. The invention also relates to a hydraulic crane comprising such a holding device.

An ordinary loader crane may be provided with a load handling tool mounted to an outer end of a crane boom in the form of a so-called outer boom, which is telescopically extensible and articulately connected to another crane boom in the form of a so-called inner boom, wherein the inner boom in its turn is articulately connected to a rotatable column of the crane. Such a loader crane may for instance be designed as a foldable knuckle boom crane where the inner and outer booms are foldable into a compact parking position when the crane is to be transported or stored. A knuckle boom crane is for instance disclosed in EP 2 080 729 A2. When a hydraulic crane of this type is to be moved from an erected working position to the parking position, the outer boom is first pivoted downwards in relation to the inner boom in order to reduce the angle between the outer and inner booms as much as possible, whereupon the inner boom is pivoted downwards in relation to the column in order to reduce the angle between the inner boom and the column as much as possible and make the crane assume its final parking position with the outer boom in an upwardly inclined position at the side of the column. The crane may subsequently be moved from the parking position to the working position by performing these movements of the inner and outer booms in the opposite order. The load handling tool is normally pivotally suspended from the outer end of the outer boom and configured to remain in a vertically suspended position under the effect of gravity when the crane is in use. If the load handling tool is free to pivot in relation to the outer boom when the crane is moved from the working position to the parking position, it will end up in a position where it projects outwards from the outer boom, as illustrated with continuous lines in FIG. 1 in EP 2 080 729 A2. In the parking position, the crane booms of the knuckle boom crane are normally positioned transversely to the longitudinal direction of the lorry. In such a case, the above-mentioned end position of the load handling tool in the parking position may result in that the load handling tool extends beyond the outer contour of the lorry and thereby constitutes an undesired obstacle that may interfere with objects in the surroundings of the lorry. In order to solve this problem, EP 2 080 729 A2 suggests the arrangement of a locking mechanism in the load handling tool or in an intermediate link provided between the outer end of the outer boom and the load handling tool, wherein this locking mechanism is configured to lock the load handling tool in a given parking position in relation to the outer boom.

Another type of solution to the above-mentioned problem is disclosed in WO 2006/121406 A1. In the solution according to WO 2006/121406 A1, a rather complicated holding device is mounted to the outer end of the outer boom and configured to move the load handling tool into a given parking position in relation to the outer boom when the telescopically displaceable crane boom sections of the outer boom are moved into their retracted positions. In the parking position, the load handling tool is supported by a support arm, which is fixed to the outer end of the foremost telescopic crane boom section of the outer boom and configured to transfer the load of the load handling tool to this telescopic crane boom section.

SUMMARY OF THE INVENTION

The object of the present invention is to provide a new and favourable solution to the above-mentioned problem.

According to the invention, this object is achieved by a holding device having the features defined herein.

The holding device of the present invention comprises:
an attachment, which is to be fixed to an outer end of one of the telescopic crane boom sections of a telescopically extensible crane boom;
a tool holder, which is detachably mountable to the attachment and configured for engagement with a load handling tool in order to support the load handling tool against the crane boom and keep the load handling tool in a given parking position in relation to the crane boom, wherein the tool holder is provided with at least one sliding member, through which the tool holder is configured to slidably rest against an external surface on the crane boom when the tool holder is mounted to the attachment; and
a locking mechanism for locking the tool holder and the attachment to each other when the tool holder is mounted to the attachment.

When the crane is to be moved into its parking position, the tool holder is manually mounted to the associated attachment, whereupon the load handling tool is brought into engagement with the tool holder. When the crane boom is pivoted in order to assume its final parking position, the tool holder keeps the load handling tool in a given parking position in relation to the crane boom and thereby prevents the load handling tool from ending up in a position where it projects outwards from the crane boom. In the final parking position, the tool holder rests against the crane boom through the sliding member, wherein the tool holder transfers the load of the load handling tool to the crane boom through the sliding member. Hereby, the attachment does not have to take up the load of the load handling tool, which implies that the attachment and the connection between the attachment and the tool holder can be given a lightweight construction that enables an easy and time efficient mounting procedure of the tool holder for the operator of the crane. When the crane boom has been moved out of the parking position and the crane is ready for use, the tool holder may be released from the attachment and removed in order to prevent the holding device from interfering with the load handling tool and objects in the surroundings during the working operations.

A knuckle boom crane may be provided with a locking member for locking the outer boom to the inner boom in the parking position of the crane and thereby relieve the load on the hydraulic cylinder between the inner and outer booms in the parking position. Such a locking member is often designed to be engaged by a short axial displacement inwards of the rearmost telescopic crane boom section of the outer boom and to be disengaged by a short axial displacement outwards of this telescopic crane boom section. The sliding member on the tool holder allows the tool holder to slide in the axial direction of the base section of the outer boom in connection with such a short axial displacement inwards or outwards of the rearmost telescopic crane boom section, which implies that the tool holder may rest against the base section of the outer boom without obstructing the movement of the rearmost telescopic crane boom section required for engaging or disengaging said locking member.

According to an embodiment of the invention, the tool holder is designed for engagement with a load handling tool provided with a lifting hook, wherein the tool holder is provided with a recess configured to receive the lifting hook in order to allow the load handling tool to be locked to the tool holder by insertion of the lifting hook into the recess. Hereby, the operator of the crane may in an easy and quick manner effect a reliable locking of the load handling tool to the tool holder.

According to another embodiment of the invention, said recess is provided on a plate which is mountable to the tool holder in different alternative positions on the tool holder. Hereby, the position of the recess may easily be adjusted in dependence on the specific design of the load handling tool in question.

According to another embodiment of the invention, the tool holder comprises at least one support bracket which is configured to support a part of the load handling tool in said parking position. This support bracket is preferably mountable to the tool holder in different alternative positions on the tool holder to thereby allow the tool holder to be adapted to the shape of the load handling tool. Hereby, the tool holder may easily be adjusted in dependence on the specific design of the load handling tool in question.

According to another embodiment of the invention, the position of the sliding member on the tool holder is adjustable to thereby allow the tool holder to be adapted to the shape of the crane boom. Hereby, the tool holder may easily be adjusted in dependence on the specific design of the crane boom.

According to another embodiment of the invention, the tool holder comprises a male-shaped coupling member configured for engagement with a corresponding female-shaped coupling member on the attachment, wherein the tool holder is mountable to the attachment by insertion of the male-shaped coupling member into the female-shaped coupling member. Hereby, the tool holder may be mounted to and detached from the attachment in an easy and quick manner.

According to another embodiment of the invention, the locking mechanism comprises a locking bolt which is insertable into holes provided in said coupling members to thereby lock the tool holder and the attachment to each other. Hereby, the tool holder may be locked to and released from the attachment in an easy and quick manner.

Further features of the holding device according to the present invention will appear from the description following below.

The invention also relates to a hydraulic crane having the features defined herein.

Further advantageous features of the hydraulic crane according to the present invention will appear from the description following below.

BRIEF DESCRIPTION OF THE DRAWINGS

With reference to the appended drawings, a specific description of embodiments of the invention cited as examples follows below. In the drawings.

DETAILED DESCRIPTION OF EMBODIMENTS OF THE INVENTION

Figure 1:
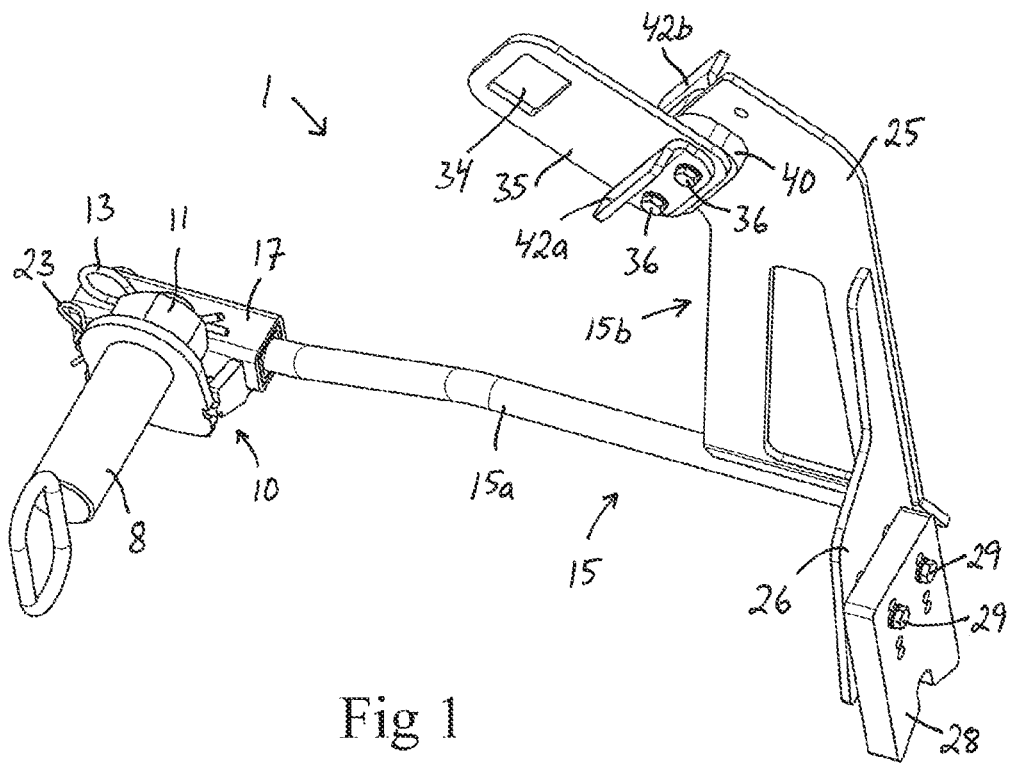
FIG. 1 is a perspective view of a holding device according to an embodiment of the present invention.
Figure 2:
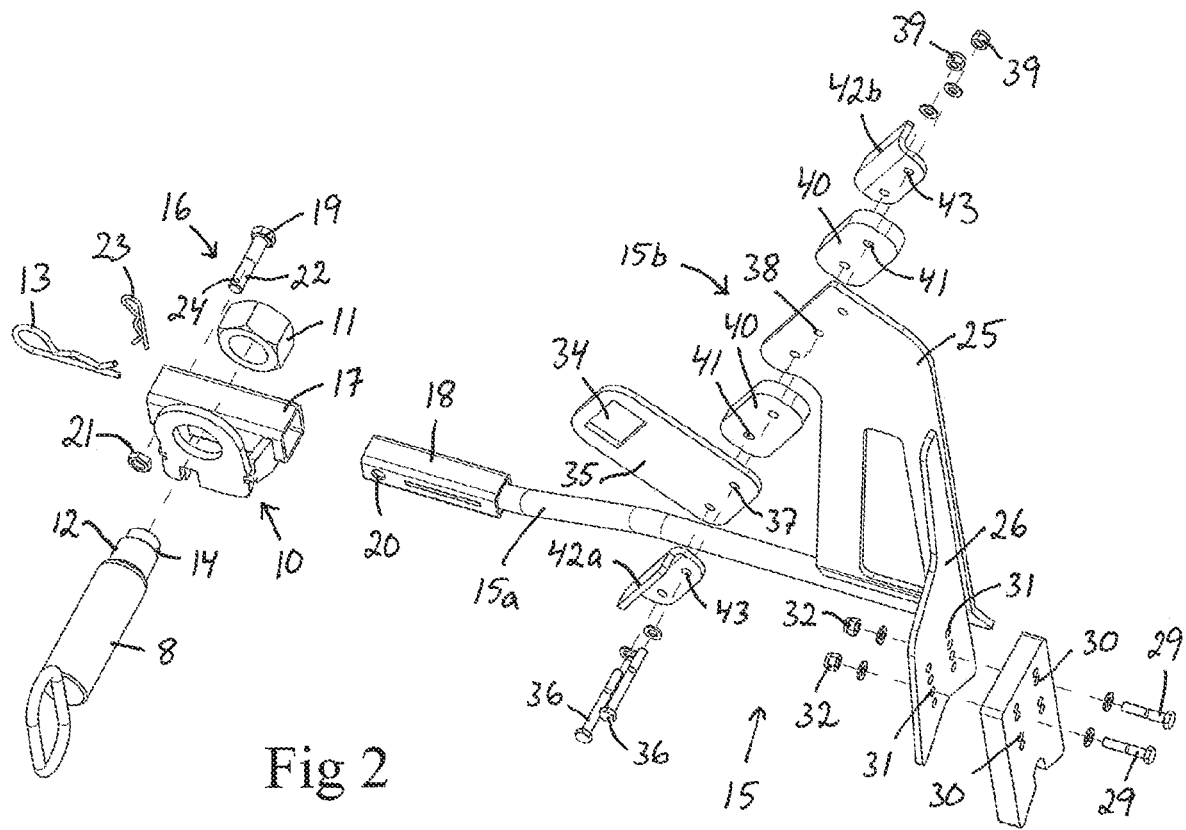
FIG. 2 is an exploded view of the holding device of FIG. 1.
Figure 3:
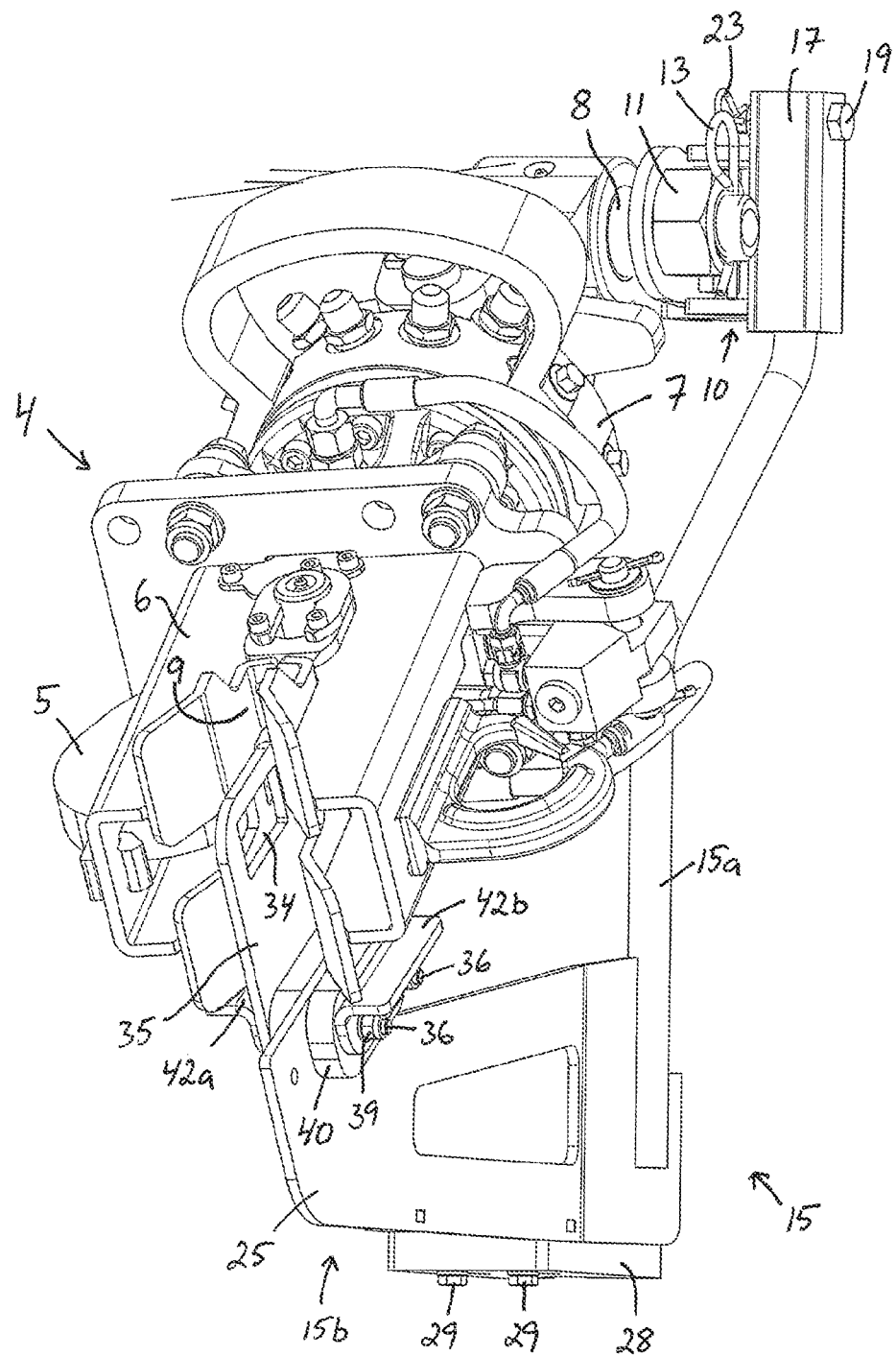
FIG. 3 is a perspective view of the holding device of FIG. 1, as seen with a load handling tool in contact with the tool holder included in the holding device.
Figure 4:
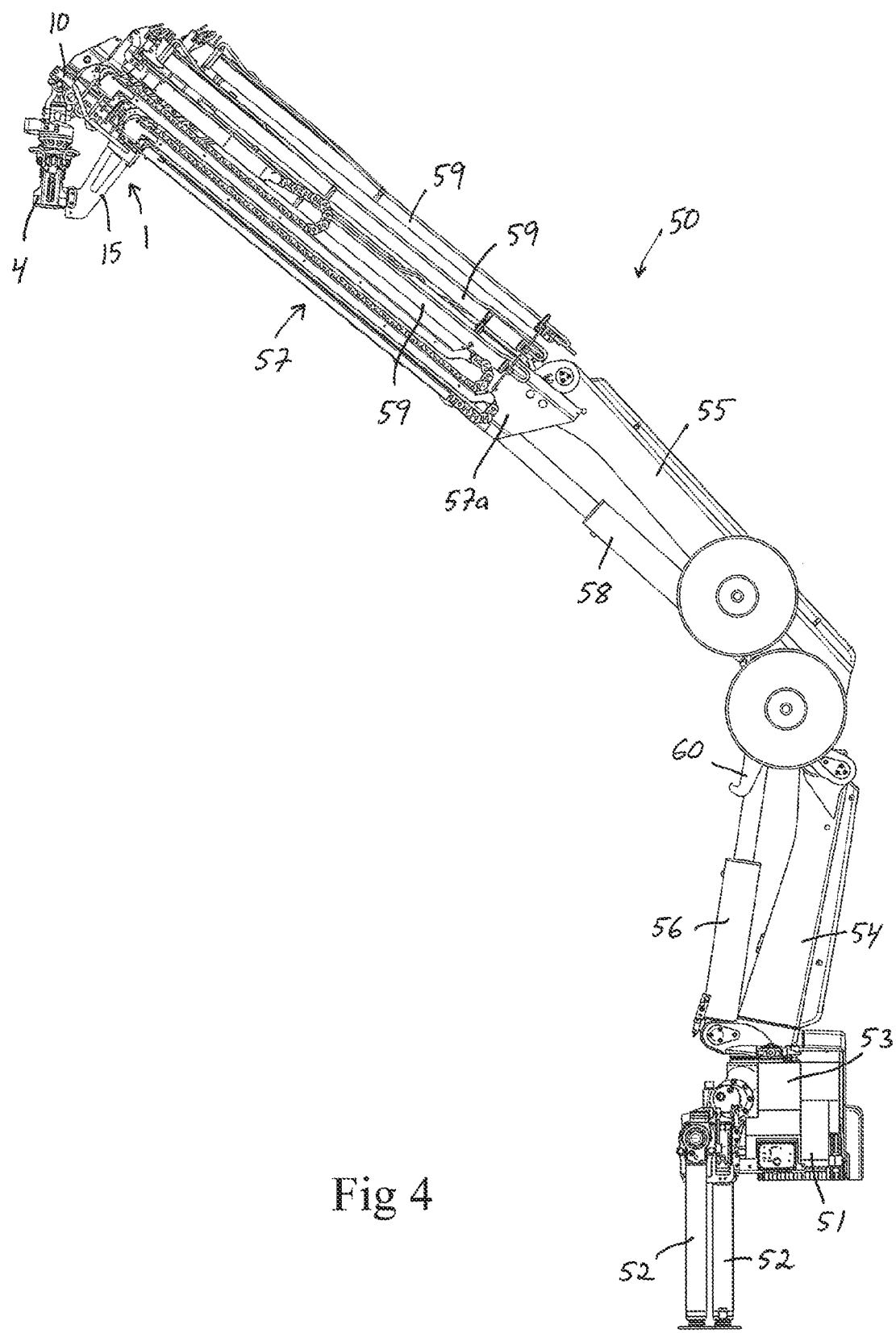
FIG. 4 is a lateral view of a hydraulic crane provided with the holding device of FIG. 1, as seen with the crane in a working position.

A holding device 1 according to an embodiment of the present invention is illustrated in FIGS. 1-3. The holding device 1 is designed for use with a telescopically extensible crane boom 57 (see FIGS. 4-6) that comprises a hollow base section 57a and one or more telescopic crane boom sections $57b_1$-$57b_4$ carried by the base section 57a. The telescopic crane boom sections $57b_1$-$57b_4$ are carried by the base section 57a and displaceable in the longitudinal direction of the base section by means of hydraulic cylinders 59 for adjustment of the extension length of the crane boom 57. In the illustrated example, the crane boom 57 is provided with four telescopic crane boom sections $57b_1$-$57b_4$, but the crane boom may of course be provided with any suitable number of telescopic crane boom sections. A first telescopic crane boom section $57b_1$, in the following referred to as the rearmost telescopic crane boom section, is received in the base section 57a and is in sliding contact with an inner wall thereof. A second telescopic crane boom section $57b_2$ is received in the rearmost telescopic crane boom section $57b_1$ and is in sliding contact with an inner wall thereof. A third telescopic crane boom section $57b_3$ is received in the second telescopic crane boom section $57b_2$ and is in sliding contact with an inner wall thereof. A fourth telescopic crane boom section $57b_4$, in the following referred to as the foremost telescopic crane boom section, is received in the third telescopic crane boom section $57b_3$ and is in sliding contact with an inner wall thereof.

The holding device 1 is adapted to co-operate with a load handling tool 4 that is articulately connected to a boom tip at an outer end of the crane boom 57, wherein the holding device 1 is configured to keep the load handling tool 4 in a given parking position in relation to the crane boom 57. In the illustrated embodiment, the holding device 1 is designed to co-operate with a load handling tool 4 provided with a lifting hook 5, which is pivotally mounted in a housing 6 so as to be pivotable in relation to the housing under the effect of a hydraulically actuated actuator, for instance in the form of a hydraulic cylinder, between an open position (see FIG. 3) and a closed position (not shown). The illustrated load handling tool 4 also comprises a rotator 7 which is pivotally mounted to a pivot shaft 8, which in its turn is to be fixed to mounting lugs 61 (see FIG. 6), the so-called "hook attachments", at the outer end of the foremost telescopic crane boom section $57b_4$. The housing 6 is fixed to the rotator 7 in order to allow the housing 6 and the lifting hook 5 to be rotated by means of the rotator about a centre axis of the rotator. As an alternative, the holding device 1 of the present invention could be designed to co-operate with any other suitable type of load handling tool, such as for instance a lifting hook without rotator or a grapple.

The holding device 1 comprises an attachment 10, which is to be fixed to an outer end of one of the telescopic crane boom sections $57b_1$-$57b_4$, preferably to the outer end of the foremost telescopic crane boom section $57b_4$. In the illustrated example, the attachment 10 is non-rotatably mounted to an end of the above-mentioned pivot shaft 8 and secured to it by means of a nut 11, which is threaded onto an external thread 12 at the end of the pivot shaft 8. The nut 11 is locked in place on this thread 12 by means of a locking pin 13, for instance in the form of an R-clip or other type of cotter pin, which is inserted into a through hole 14 at the end of the pivot shaft 8.

The holding device 1 also comprises a tool holder 15, which is detachably mountable to the attachment 10 and configured to be engaged with the load handling tool 4 in order to support the load handling tool against the base section 57a of the crane boom 57 and keep the load handling tool 4 in said parking position. The holding device 1 further comprises a locking mechanism 16 for locking the tool holder 15 and the attachment 10 to each other when the tool holder is mounted to the attachment. In the illustrated embodiment, the attachment 10 comprises a hollow part, which forms a female-shaped coupling member 17 designed for engagement with a corresponding male-shaped coupling member 18 on the tool holder 15, wherein the tool holder 15 is mountable to the attachment 10 by insertion of the male-shaped coupling member 18 into the female-shaped coupling member 17. Alternatively the attachment 10 comprises a male-shaped coupling member designed for engagement with a corresponding female-shaped coupling member on the tool holder 15.

In the illustrated embodiment, the above-mentioned locking mechanism 16 comprises a locking bolt 19 which is insertable into holes 20 provided in the female-shaped and male-shaped coupling members 17, 18 to thereby lock the tool holder 15 and the attachment 10 to each other. In the illustrated example, the locking bolt 19 is secured to attachment 10 by means of a nut 21, which is threaded onto an external thread 22 at the end of the locking bolt 19. The nut 21 is locked in place on this thread 22 by means of a locking pin 23, for instance in the form of an R-clip or other type of cotter pin, which is inserted into a through hole 24 at the end of the locking bolt 19.

The tool holder 15 preferably comprises a rod-shaped part 15a and a base part 15b which is connected to the male-shaped coupling member 18 via the rod-shaped part 15a, wherein the male-shaped coupling member 18 is fixed to a first end of the rod-shaped part 15a and the base part 15b is fixed to an opposite second end of the rod-shaped part 15a. In the illustrated embodiment, the base part 15b is plate-shaped and formed by a first plate-shaped element 25, which is fixed to the rod-shaped part 15a, and a second plate-shaped element 26, which is fixed to the first plate-shaped element 25 and extends essentially perpendicularly therefrom.

Figure 6:
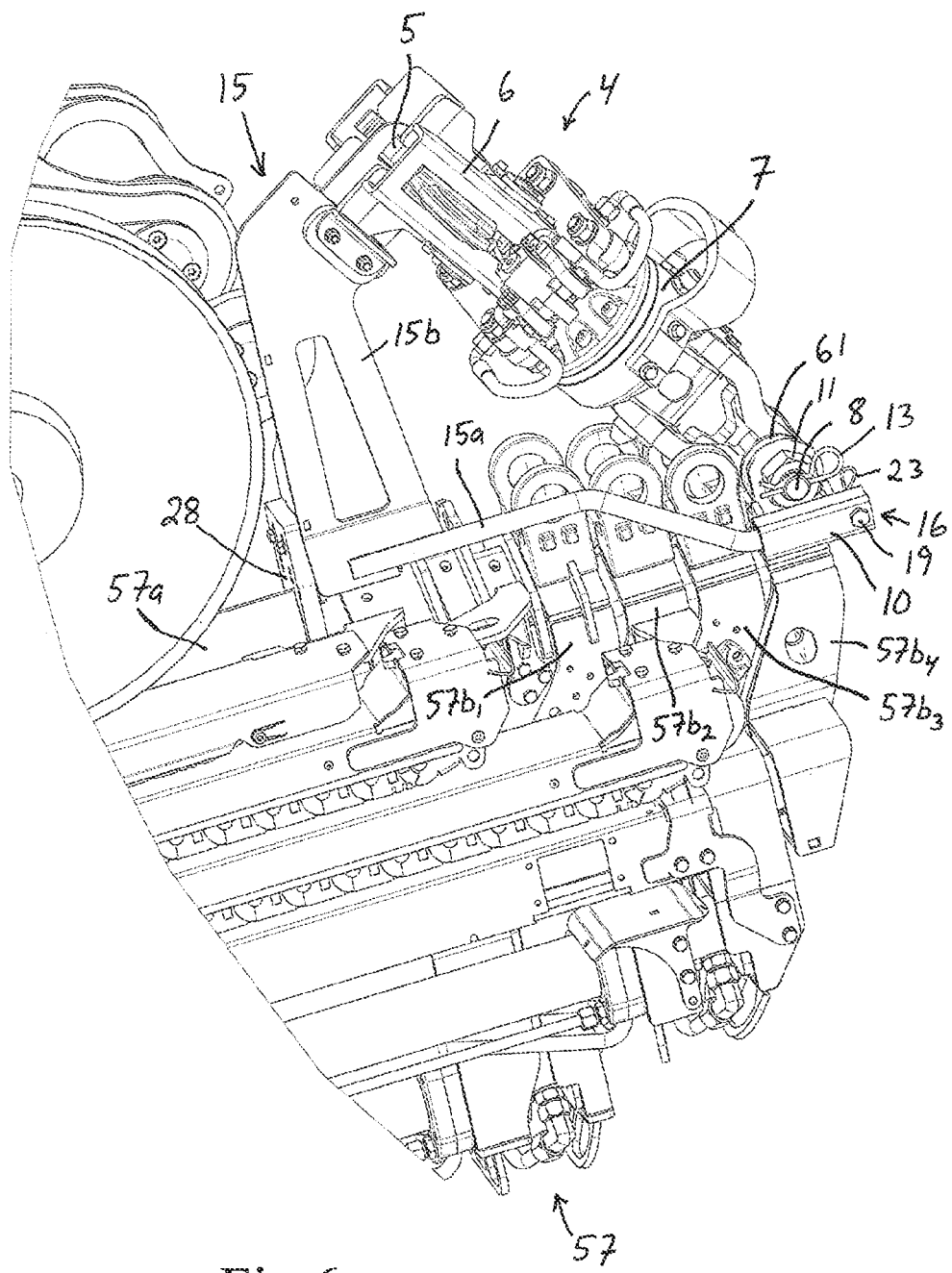
FIG. 6 is a perspective view of a part of the crane of FIG. 4, as seen in the parking position.

The tool holder 15 is provided with a sliding member 28, through which the tool holder 15 is configured to slidably rest against an external surface on the base section 57a of the crane boom 57 when the tool holder 15 is mounted to the attachment 10. In the illustrated example, said external surface forms part of the tubular external wall of the base section 57a, as illustrated in FIG. 6. As an alternative, the tool holder 15 could be configured to slidably rest against an external surface on one of the telescopic crane boom sections of the crane boom 57 through the sliding member 28 when the tool holder 15 is mounted to the attachment 10, for instance against a surface which forms part of the tubular external wall of the rearmost telescopic crane boom section $57b1$.

The sliding member 28 is preferably of plastic material, whereas the rest of the tool holder 15 and the attachment 10 preferably are of metallic material.

The position of the sliding member 28 on the tool holder 15 is with advantage adjustable to thereby allow the tool holder to be adapted to the shape of the base section 57a of the crane boom. In the illustrated embodiment, the sliding member 28 is mounted to the base part 15b of the tool holder 15 by means of bolts 29, which are insertable into bolt holes 30, 31 provided in the sliding member 28 and in the second plate-shaped element 26 of the base part 15b. The sliding member 28 and the second plate-shaped element 26 are provided with several bolt holes 30, 31 arranged in columns in order to allow the position of the sliding member 28 on the second plate-shaped element 26 to be adjusted by a suitable selection of bolt holes for the bolts 29. Each bolt 29 is secured to the sliding member 28 and the second plate-shaped element 26 by means of a nut 32, which is threaded onto an external thread at the end of the bolt 29.

The illustrated tool holder 15 is provided with a recess 34 configured to receive the lifting hook 5 of the load handling tool 4 in order to allow the load handling tool 4 to be locked to the tool holder 15 by insertion of the lifting hook 5 into the recess 34. In the illustrated embodiment, the recess 34 is provided on a plate 35, which is mountable to the base part 15b of the tool holder 15 in different alternative positions in order to allow the position of the recess 34 to be adjusted to the specific design of the load handling tool 4. The plate 35 is mounted to the base part 15b of the tool holder 15 by means of bolts 36, which are insertable into bolt holes 37, 38 provided in the plate 35 and in the first plate-shaped element 25 of the base part 15b. The first plate-shaped element 25 is provided with several bolt holes 38 arranged in a row in order to allow the position of the plate 35 on the first plate-shaped element 25 to be adjusted by a suitable selection of bolt holes for the bolts 36. Each bolt 36 is secured to the plate 35 and the first plate-shaped element 25 by means of a nut 39, which is threaded onto an external thread at the end of the bolt 36. In order to locate the recess 34 in a suitable position for the lifting hook 5, the plate 35 may be positioned on a first side or an opposite second side of the first plate-shaped element 25 and a suitable number of shims 40 may be arranged between the plate 35 and the first plate-shaped element 25. In the illustrated example, the shims 40 are mounted to the first plate-shaped element 25 by means of the above-mentioned bolts 36, which are insertable into bolt holes 41 provided in the shims 40. The plate 35 is designed to fit into a downwardly open gap 9 provided at the lower end of the load handling tool 4, as illustrated in FIG. 3, to thereby allow the recess 34 to be positioned in the gap 9 in front of the lifting hook 5, wherein the lifting hook 5 will move into the recess 34 when the lifting hook thereafter is actuated to move across the gap 9.

The tool holder 15 preferably comprises at least one support bracket 42a, 42b configured to support a part of the load handling tool 4 in its parking position. In the illustrated embodiment, a first support bracket 42a is arranged on a first side of the first plate-shaped element 25 of the base part 15b and a second support bracket 42b is arranged on an opposite second side of the first plate-shaped element 25. The first and second support brackets 42a, 42b are arranged on either side of the plate 35 with the recess 34. In the illustrated example, the support brackets 42a, 42b are mounted to the first plate-shaped element 25 by means of the above-mentioned bolts 36, which are insertable into bolt holes 43 provided in the support brackets 42a, 42b. Thus, the position of each support bracket 42a, 42b in relation to the first plate-shaped element 25 may be varied in the same manner as position of the plate 35 to thereby allow the tool holder to be adapted to the shape of the load handling tool 4.

A hydraulic crane 50 in the form of a foldable knuckle boom crane provided with a holding device 1 of the type described above is illustrated in FIGS. 4-6. The illustrated crane 50 is mounted on a frame 51, which for instance may be connected to the chassis of a lorry. The frame 51 is provided with adjustable support legs 52 for supporting the crane 50. The crane 50 comprises:

- a crane base 53, which is fixed to the frame 51;
- a column 54, which is rotatably mounted to the crane base 53 so as to be rotatable in relation to the crane base about an essentially vertical axis of rotation by means of an actuating device (not shown);
- a liftable and lowerable first crane boom 55, in the following denominated inner boom, which is articulately connected to the column 54 in such a manner that it is pivotable in relation to the column about an essentially horizontal axis of rotation;
- a first hydraulic cylinder 56 for lifting and lowering the inner boom 55 in relation to the column 54;
- a liftable and lowerable second crane boom 57, in the following denominated outer boom, which is articulately connected to the inner boom 55 in such a manner that it is pivotable in relation to the inner boom about an essentially horizontal axis of rotation; and
- a second hydraulic cylinder 58 for lifting and lowering of the outer boom 57 in relation to the inner boom 55.

In this description and the subsequent claims, the expression "liftable and lowerable crane boom" refers to a crane boom which can be pivoted in a vertical plane so as to thereby perform liftings and lowerings of a load carried by the crane. The expression "hydraulic cylinder for lifting and lowering the crane boom" here refers to the hydraulic cylinder which is associated with the liftable and lowerable crane boom and which carries out the pivoting thereof in a vertical plane.

The outer boom 57 is telescopically extensible to enable an adjustment of the extension length thereof. The outer boom 57 comprises a base section 57a, through which the outer boom 57 is articulately connected to the inner boom 55, and several telescopic crane boom sections 57b1-57b4 (see FIGS. 5 and 6) which are carried by the base section 57a and displaceable in the longitudinal direction of the base section by means of hydraulic cylinders 59 for adjustment of the extension length of the outer boom 57.

Figure 5:
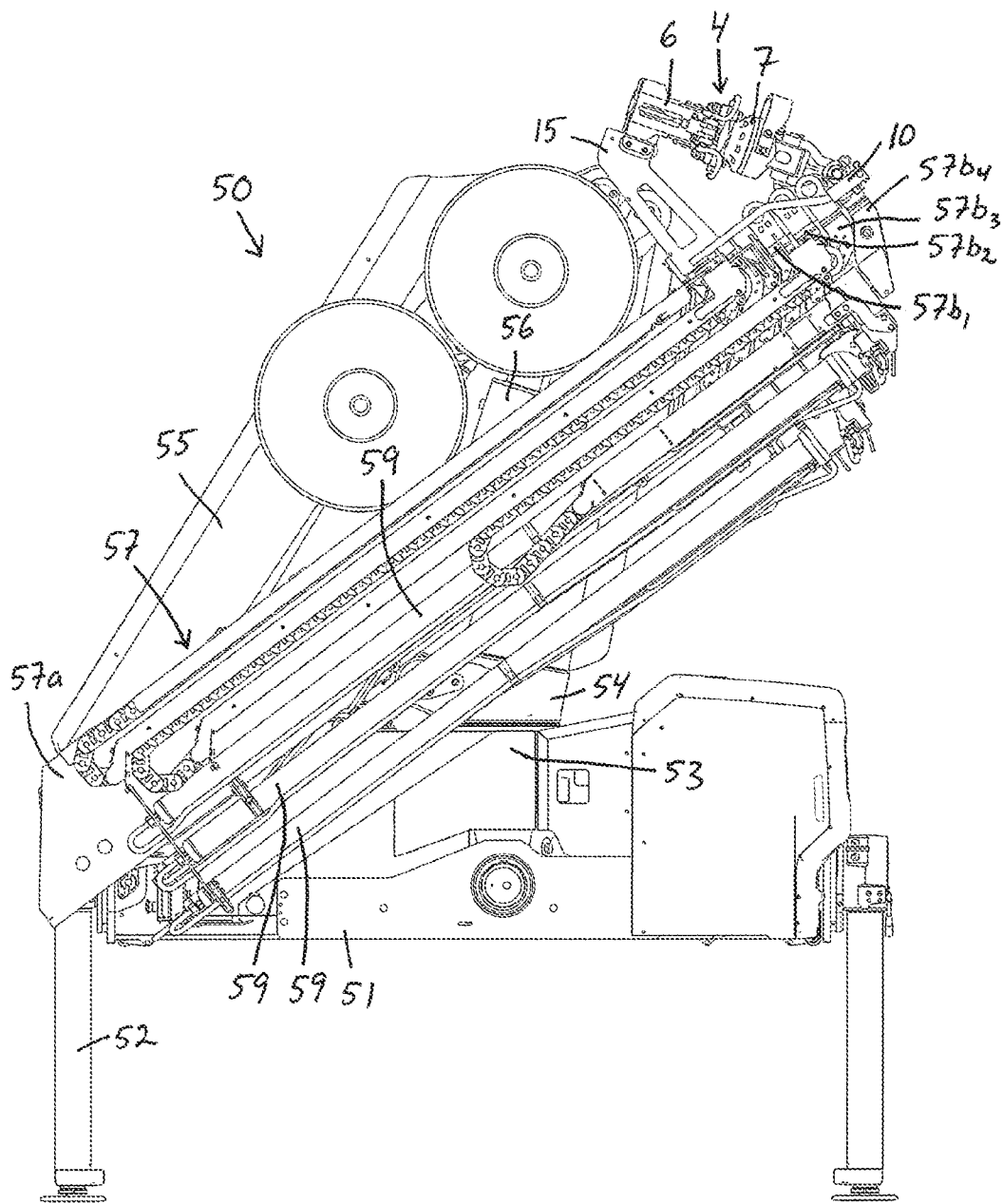
FIG. 5 is a frontal view of the crane of FIG. 4, as seen with the crane in a folded parking position.

The inner and outer booms 55, 57 of the crane are foldable into a compact parking position when the crane is to be transported or stored, as illustrated in FIG. 5. When the inner and outer booms 55, 57 are to be folded into the parking position from an erected working position, the telescopic crane boom sections 57b1-57b4 of the outer boom 57 are first retracted into the base section 57a of the outer boom, whereupon the outer boom 57 is folded downwards towards the inner boom 55 so as to assume a position essentially in parallel with the inner boom. Thereafter, the inner boom 55 is folded downwards together with the outer boom 57 towards the frame 51 to the final parking position illustrated in FIG. 5. The inner and outer booms 55, 57 are moved in the opposite manner when they are to be moved from the parking position to the erected working position.

The load handling tool 4 and the attachment 10 are mounted to the outer end of the foremost telescopic crane boom section $57b_4$ of the outer boom 57.

The crane 50 is provided with a locking member 60 (see FIG. 4) for locking the outer boom 57 to the inner boom 55 in the parking position of the crane and thereby relieve the load on the second hydraulic cylinder 58 in the parking position. The locking member 60 may be designed to be engaged with the outer boom 57 by a short axial displacement inwards of one of the telescopic crane boom sections $57b_1$-$57b_4$, for instance the rearmost telescopic crane boom section $57b_1$, in relation to the base section 57a, and to be disengaged from the outer boom 57 by a short axial displacement outwards of the telescopic crane boom section in question in relation to the base section 57a. The sliding member 28 on the tool holder 15 allows the tool holder to slide in the axial direction of the base section 57a of the outer boom in connection with such a short axial displacement inwards or outwards of the telescopic crane boom section, which implies that the tool holder 15 may rest against the base section 57a of the outer boom 57 without obstruction the movement of the telescopic crane boom section required for engaging or disengaging the locking member 60.

When the inner and outer booms 55, 57 are to be folded into the parking position from an erected working position, the tool holder 15 is manually mounted to the attachment 10 and locked to it by means of the locking bolt 19. Thereafter, the crane booms 55, 57 and the load handling tool 4 are maneuvered such that the load handling tool 4 comes to lean against the support brackets 42a, 42b on the tool holder 15 with the plate 35 received in the downwardly open gap 9 at the lower end of the load handling tool 4. When the load handling tool 4 has been correctly positioned in relation to the tool holder 15, the lifting hook 5 on the load handling tool is actuated so as to move forwards across the gap 9 and into the recess 34 provided on the plate 35 to thereby lock the load handling tool 4 to the tool holder 15. The tool holder 15 defines a given parking position of the load handling tool 4 in relation to the outer boom 57 and keeps the load handling tool in this position in relation to the outer boom 57 during the subsequent movements of the outer boom 57 into the parking position of the crane. In the final parking position of the crane 50, the tool holder 15 keeps the load handling tool 4 inclined inwards, i.e. towards the column 54 of the crane, and in a position above the outer boom 57, as illustrated in FIG. 5. If any of the telescopic crane boom sections $57b_1$-$57b_4$ of the outer boom 57 has to be subjected to a small axial movement in relation to the base section 57a of the outer boom in order to engage the locking member 60 and thereby lock the outer boom 57 to the inner boom 55, the sliding member 28 on the tool holder 15 allows the tool holder to slide in relation to the base section 57a during this axial movement of the telescopic crane boom section.

The attachment 10 and the tool holder 15 may of course also have any other suitable configurations than the ones illustrated in the drawings.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A holding device for use with a telescopically extensible crane boom (57) that comprises a base section (57a) and one or more telescopic crane boom sections (57b1-57b4) carried by the base section (57a), wherein
    the holding device (1) is adapted to cooperate with a load handling tool (4) pivotally connected to an outer end of the crane boom (57), to keep the load handling tool (4) in a given parking position in relation to the crane boom (57), the holding device (1) comprises:
- an attachment (10), which is to be fixed to an outer end of one of the telescopic crane boom sections (57*b*1-57*b*4) of the crane boom;
- a tool holder (15), which is detachably mountable to the attachment (10) and configured for engagement with the load handling tool (4) in order to support the load handling tool (4) against the crane boom (57) and keep the load handling tool (4) in said parking position,
- the tool holder (15) is provided with at least one sliding member (28), through which the tool holder (15) is configured to slidably rest against an external surface on the crane boom (57) when the tool holder (15) is mounted to the attachment (10); and
- a locking mechanism (16) for locking the tool holder (15) and the attachment (10) to each other when the tool holder (15) is mounted to the attachment (10).

2. A holding device according to claim 1, wherein
the tool holder (15) is designed for engagement with a load handling tool (4) provided with a lifting hook (5), and
the tool holder (15) is provided with a recess (34) configured to receive the lifting hook (5) to allow the load handling tool (4) to be locked to the tool holder (15) by insertion of the lifting hook (5) into the recess (34).

3. A holding device according to claim 2, wherein the recess (34) is provided on a plate (35) which is designed to fit into a downwardly open gap (9) at the lower end of the load handling tool (4).

4. A holding device according to claim 3, wherein the plate (35) is mountable to the tool holder (15) in different alternative positions on the tool holder (15).

5. A holding device according to claim 4, wherein the tool holder (15) comprises at least one support bracket (42*a*, 42*b*) which is configured to support a part of the load handling tool (4) in said parking position.

6. A holding device according to claim 5, wherein said support bracket (42*a*, 42*b*) is mountable to the tool holder (15) in different alternative positions on the tool holder (15) to allow the tool holder to be adapted to the shape of the load handling tool (4).

7. A holding device according to claim 6, wherein the position of the sliding member (28) on the tool holder (15) is adjustable to allow the tool holder to be adapted to the shape of the crane boom (57).

8. A holding device according to claim 3, wherein the tool holder (15) comprises at least one support bracket (42*a*, 42*b*) which is configured to support a part of the load handling tool (4) in said parking position.

9. A holding device according to claim 8, wherein said support bracket (42*a*, 42*b*) is mountable to the tool holder (15) in different alternative positions on the tool holder (15) to allow the tool holder to be adapted to the shape of the load handling tool (4).

10. A holding device according to claim 2, wherein the tool holder (15) comprises at least one support bracket (42*a*, 42*b*) which is configured to support a part of the load handling tool (4) in said parking position.

11. A holding device according to claim 10, wherein said support bracket (42*a*, 42*b*) is mountable to the tool holder (15) in different alternative positions on the tool holder (15) to allow the tool holder to be adapted to the shape of the load handling tool (4).

12. A holding device according to claim 1, wherein the tool holder (15) comprises at least one support bracket (42*a*, 42*b*) which is configured to support a part of the load handling tool (4) in said parking position.

13. A holding device according to claim 12, wherein said support bracket (42*a*, 42*b*) is mountable to the tool holder (15) in different alternative positions on the tool holder (15) to allow the tool holder to be adapted to the shape of the load handling tool (4).

14. A holding device according to claim 1, wherein the position of the sliding member (28) on the tool holder (15) is adjustable to allow the tool holder to be adapted to the shape of the crane boom (57).

15. A holding device according to claim 1, wherein
the tool holder (15) comprises a male-shaped coupling member (18) configured for engagement with a corresponding female-shaped coupling member (17) on the attachment (10), and
the tool holder (15) is mountable to the attachment (10) by insertion of the male-shaped coupling member (18) into the female-shaped coupling member (17).

16. A holding device according to claim 15, wherein the locking mechanism (16) comprises a locking bolt (19) which is insertable into holes (20) provided in said coupling members (17, 18) to lock the tool holder (15) and the attachment (10) to each other.

17. A hydraulic crane, comprising
a crane base (53);
a column (54), which is rotatably mounted to the crane base (53) to be rotatable in relation to the crane base about an essentially vertical axis of rotation;
a liftable and lowerable first crane boom (55) articulately connected to the column (54); and
a liftable and lowerable second crane boom (57) articulately connected to the first crane boom (55), wherein
the second crane boom (57) is telescopically extensible to enable an adjustment of the extension length thereof and comprises a base section (57*a*), through which the second crane boom (57) is articulately connected to the first crane boom (55), and one or more telescopic crane boom sections (57*b*1-57*b*4) carried by the base section (57*a*),
the hydraulic crane (50) comprises a holding device (1) according to claim 1 adapted to co-operate with a load handling tool (4) pivotally connected to an outer end of the second crane boom (57), to keep the load handling tool (4) in a given parking position in relation to the second crane boom (57),
the attachment (10) of the holding device (1) is fixed to an outer end of one of the telescopic crane boom sections (57*b*1-57*b*4) of the second crane boom; and
the tool holder (15) of the holding device (1), when mounted to the attachment (10) and engaged with the load handling tool (4), is configured to support the load handling tool (4) against the second crane boom (57) with the tool holder (15) in slidable contact with an external surface on the second crane boom (57) through the sliding member (28) on the tool holder.

18. A hydraulic crane according to claim 17, wherein the attachment (10) is mounted to an end of a shaft (8) which is provided at the outer end of the second crane boom (57) and which forms a pivot shaft for the load handling tool (4).

19. A hydraulic crane according to claim 17, wherein the hydraulic crane (50) is a foldable knuckle boom crane.

20. A hydraulic crane according to claim 17, wherein the tool holder (15) of the holding device (1), when mounted to the attachment (10) and engaged with the load handling tool (4), is configured to support the load handling tool (4) against the base section (57*a*) of the second crane boom (57) with the tool holder (15) in slidable contact with an external wall of the base section (57*a*) through the sliding member (28) on the tool holder.

\* \* \* \* \*